(12) United States Patent
Ueda

(10) Patent No.: US 11,898,457 B2
(45) Date of Patent: Feb. 13, 2024

(54) BEARING AND TURBOCHARGER

(71) Applicant: IHI Corporation, Tokyo (JP)

(72) Inventor: Akihiro Ueda, Tokyo (JP)

(73) Assignee: IHI Corporation, Tokyo (JP)

( * ) Notice: Subject to any disclaimer, the term of this patent is extended or adjusted under 35 U.S.C. 154(b) by 0 days.

(21) Appl. No.: 18/158,693

(22) Filed: Jan. 24, 2023

(65) Prior Publication Data

US 2023/0160321 A1 May 25, 2023

Related U.S. Application Data

(63) Continuation of application No. PCT/JP2021/038388, filed on Oct. 18, 2021.

(30) Foreign Application Priority Data

Nov. 17, 2020 (JP) ................................. 2020-191119

(51) Int. Cl.
*F01D 25/18* (2006.01)
*F01D 25/16* (2006.01)

(52) U.S. Cl.
CPC ........... *F01D 25/18* (2013.01); *F01D 25/168* (2013.01); *F05D 2220/40* (2013.01); *F05D 2240/52* (2013.01); *F05D 2260/98* (2013.01)

(58) Field of Classification Search
CPC .... F01D 25/18; F01D 25/168; F05D 2220/40; F05D 2240/52; F05D 2260/98
See application file for complete search history.

(56) References Cited

U.S. PATENT DOCUMENTS

| 6,045,266 A | 4/2000 | Mitsubori et al. |
| 2018/0087518 A1 | 3/2018 | Bischof |

(Continued)

FOREIGN PATENT DOCUMENTS

| DE | 203 17 497 U1 | 4/2004 |
| JP | 58-172114 U | 11/1983 |

(Continued)

OTHER PUBLICATIONS

International Search Report dated Dec. 21, 2021 in PCT/JP2021/038388 filed on Oct. 18, 2021 2 pages.

(Continued)

*Primary Examiner* — Jacob M Amick
*Assistant Examiner* — Charles J Brauch
(74) *Attorney, Agent, or Firm* — Oblon, McClelland, Maier & Neustadt, L.L.P.

(57) ABSTRACT

A bearing includes: an annular main body through which a shaft is inserted; a plurality of oil supply grooves included on an inner curved surface of the main body and extending in an axial direction of the main body; a thrust bearing surface included on an end surface of the main body; a plurality of tapered portions included on the thrust bearing surface separated from an outer peripheral edge of the thrust bearing surface at intervals in a circumferential direction of the main body and communicating with the oil supply grooves, the tapered portions each becoming shallower as it extends in the circumferential direction; and an oil discharge groove included on the thrust bearing surface, passing through one tapered portion among the plurality of tapered portions, and connecting an oil supply groove and the outer peripheral edge.

8 Claims, 7 Drawing Sheets

(56) References Cited

U.S. PATENT DOCUMENTS

| | | |
|---|---|---|
| 2018/0087519 A1 | 3/2018 | Bischof |
| 2019/0203731 A1 | 7/2019 | Bischof |

FOREIGN PATENT DOCUMENTS

| | | | |
|---|---|---|---|
| JP | 6-288411 A | | 10/1994 |
| JP | H06288411 A | * | 10/1994 |
| JP | 9-273555 A | | 10/1997 |
| JP | 11-13476 A | | 1/1999 |
| JP | 2002-206522 A | | 7/2002 |
| JP | 2007-23858 A | | 2/2007 |
| JP | 2012-31979 A | | 2/2012 |
| JP | 2012-219866 A | | 11/2012 |
| JP | 2013-113412 A | | 6/2013 |
| JP | 2014-101826 A | | 6/2014 |
| JP | 5807436 B2 | | 11/2015 |
| JP | 2019-529832 A | | 10/2019 |

OTHER PUBLICATIONS

Y. Maeda et al., "Bearing and Lubrication System for IHI (ABB) Marine Turbocharger" Journal of Gas Turbine Society of Japan vol. 43, No. 4, Jul. 2015, pp. 262-267 with Partial English Machine Translation.

German Office Action dated Jun. 29, 2023 in German Patent Application No. 112021003728.5, 9 pages.

Office Action dated Dec. 5, 2023, issued in Japanese Application No. 2022-563639, with machine English translation.

\* cited by examiner

BEARING AND TURBOCHARGER

CROSS REFERENCE TO RELATED APPLICATIONS

This application is a continuation application of International Application No. PCT/JP2021/038388, filed on Oct. 18, 2021, which claims priority to Japanese Patent Application No. 2020-191119, filed on Nov. 17, 2020, the entire contents of which are incorporated by reference herein.

BACKGROUND ART

Technical Field

The present disclosure relates to a bearing and a turbocharger. The present application claims the benefit of priority based on Japanese Patent Application No. 2020-191119 filed on Nov. 17, 2020, the content of which is incorporated herein.

Related Art

In various devices, a bearing that pivotally supports a shaft is used. For example, Patent Literature 1 discloses a turbocharger including a bearing that pivotally supports a shaft. Lubricating oil is supplied to a bearing used in a turbocharger or the like.

CITATION LIST

Patent Literature

Patent Literature 1: Japanese Patent No. 5807436

SUMMARY

Technical Problem

As a bearing that pivotally supports a shaft, there is a bearing having a thrust bearing surface that supports a member axially adjacent to the bearing in a thrust direction (that is, a thrust bearing). Lubricating oil supplied to the inside of the bearing is supplied to the thrust bearing surface of the bearing as the shaft rotates. A thrust load (that is, a load in the thrust direction) is supported by an oil film pressure of the lubricating oil supplied to the thrust bearing surface. In such a bearing, it is desired to increase the withstanding load (in other words, the load capacity) in the thrust direction.

It is an object of the present disclosure to provide a bearing and a turbocharger capable of increasing the withstanding load of the bearing in the thrust direction.

Solution to Problem

In order to solve the above problem, a bearing of the present disclosure includes: an annular main body through which a shaft is inserted; a plurality of oil supply grooves included on an inner curved surface of the main body and extending in an axial direction of the main body; a thrust bearing surface included on an end surface of the main body; a plurality of tapered portions included on the thrust bearing surface separated from an outer peripheral edge of the thrust bearing surface at intervals in a circumferential direction of the main body and communicating with the oil supply grooves, the tapered portions each becoming shallower as the tapered portion extends in the circumferential direction; and an oil discharge groove included on the thrust bearing surface and passing through one tapered portion among the plurality of tapered portions, the oil discharge groove connecting an oil supply groove and the outer peripheral edge.

A ratio of the flow path cross-sectional area of an opening of the oil discharge groove on the outer peripheral edge side to the area of the thrust bearing surface may be less than or equal to 0.01.

A ratio of the flow path cross-sectional area of an opening of the oil discharge groove on the outer peripheral edge side to the area of the thrust bearing surface may be greater than or equal to 0.003.

In order to solve the above disadvantage, a turbocharger of the present disclosure includes the bearing described above.

Effects of Disclosure

According to the present disclosure, it is possible to improve the withstanding load of a bearing in the thrust direction.

DESCRIPTION OF EMBODIMENTS

An embodiment of the present disclosure will be described below by referring to the accompanying drawings. Dimensions, materials, other specific numerical values, and the like illustrated in the embodiment is merely an example for facilitating understanding, and the present disclosure is not limited thereto unless otherwise specified. Note that, in the present specification and the drawings, components having substantially the same function and structure are denoted by the same symbol, and redundant explanations are omitted. Illustration of components not directly related to the present disclosure is omitted.

Figure 1:
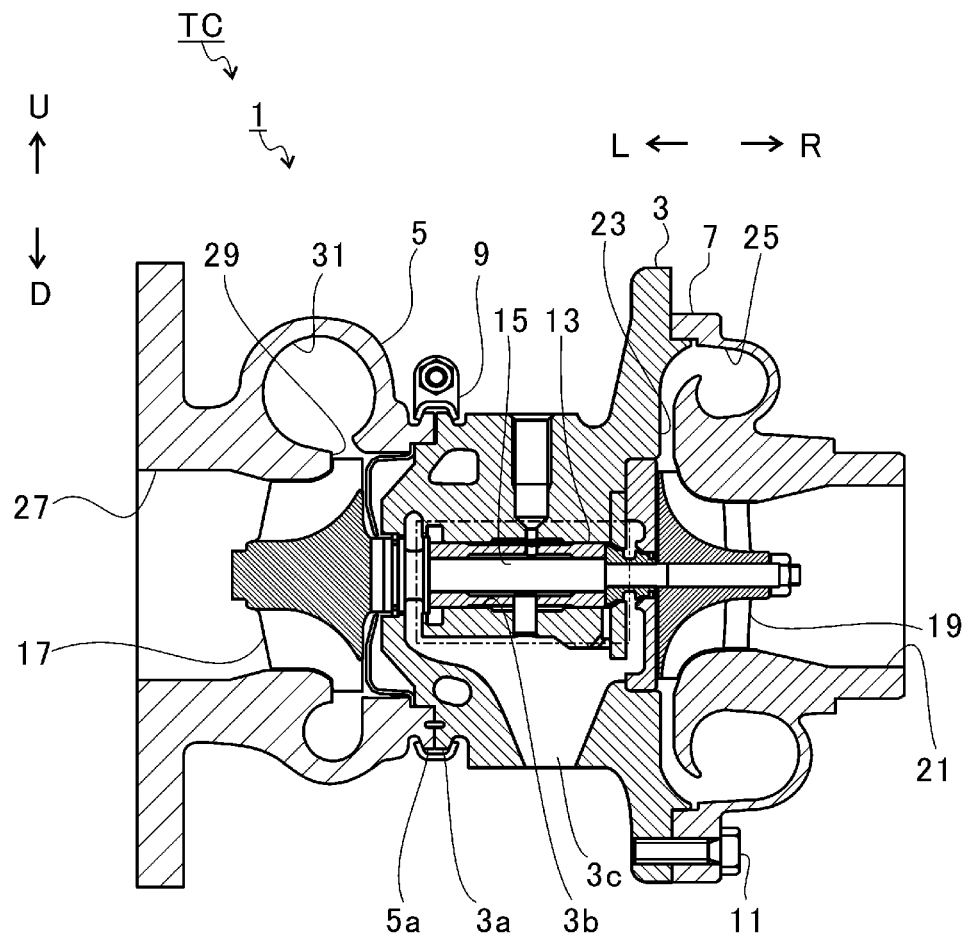
FIG. 1 is a schematic cross-sectional view illustrating a turbocharger according to an embodiment of the present disclosure.

FIG. 1 is a schematic cross-sectional view of a turbocharger TC. In FIG. 1, the direction of arrow U is the vertically upward direction, and the direction of arrow D direction is the vertically downward direction. Hereinafter, description is given on the premise that the direction of arrow L illustrated in FIG. 1 is the left side of the turbocharger TC. Description is given on the premise that the direction of arrow R illustrated in FIG. 1 is the right side of the turbocharger TC. As illustrated in FIG. 1, the turbocharger TC includes a turbocharger main body 1. The turbocharger main body 1 includes a bearing housing 3, a turbine housing 5, and a compressor housing 7. The turbine housing 5 is connected to the left side of the bearing housing 3 by a fastening mechanism 9. The compressor housing 7 is connected to the right side of the bearing housing 3 by a fastening bolt 11.

A protrusion 3a is formed on the outer curved surface of the bearing housing 3. The protrusion 3a is formed closer to the turbine housing 5. The protrusion 3a protrudes in a radial direction of the bearing housing 3. A protrusion 5a is formed on the outer curved surface of the turbine housing 5. The protrusion 5a is formed closer to the bearing housing 3. The protrusion 5a protrudes in a radial direction of the turbine housing 5. The bearing housing 3 and the turbine housing 5 are band-fastened to each other by the fastening mechanism 9. The fastening mechanism 9 is, for example, a G coupling. The fastening mechanism 9 clamps the protrusions 3a and 5a.

A bearing hole 3b is formed in the bearing housing 3. The bearing hole 3b penetrates through the turbocharger TC in the left-right direction. A bearing 13 is disposed in the bearing hole 3b. The bearing 13 is a semi-floating bearing. However, as will be described later, the bearing 13 may be a bearing other than a semi-floating bearing. The bearing 13 pivotally supports a shaft 15 in a freely rotatable manner. At the left end of the shaft 15, a turbine blade wheel 17 is provided. The turbine blade wheel 17 is housed in the turbine housing 5 in a freely rotatable manner. At the right end of the shaft 15, a compressor impeller 19 is provided. The compressor impeller 19 is housed in the compressor housing 7 in a freely rotatable manner. An oil discharge port 3c for discharging lubricating oil scattered from the bearing 13 is formed in a lower portion of the bearing housing 3.

An intake port 21 is formed in the compressor housing 7. The intake port 21 opens to the right side of the turbocharger TC. The intake port 21 is connected to an air cleaner (not illustrated). Facing surfaces of the bearing housing 3 and the compressor housing 7 form a diffuser flow path 23. The diffuser flow path 23 pressurizes the air. The diffuser flow path 23 is formed in an annular shape. The diffuser flow path 23 communicates with the intake port 21 via the compressor impeller 19 on an inner side in the radial direction.

A compressor scroll flow path 25 is formed in the compressor housing 7. The compressor scroll flow path 25 is formed in an annular shape. The compressor scroll flow path 25 is positioned on an outer side in the radial direction of the shaft 15 with respect to the diffuser flow path 23. The compressor scroll flow path 25 communicates with an intake port of an engine (not illustrated) and the diffuser flow path 23. When the compressor impeller 19 rotates, the air is sucked from the intake port 21 into the compressor housing 7. The sucked air is pressurized and accelerated in the process of flowing between the blades of the compressor impeller 19. The pressurized and accelerated air is further pressurized by the diffuser flow path 23 and the compressor scroll flow path 25. The pressurized air is guided to the intake port of the engine.

A discharge port 27 is formed in the turbine housing 5. The discharge port 27 opens to the left side of the turbocharger TC. The discharge port 27 is connected to an exhaust gas purification device (not illustrated). A communication passage 29 and a turbine scroll flow path 31 are formed in the turbine housing 5. The turbine scroll flow path 31 is formed in an annular shape. The turbine scroll flow path 31 is positioned, for example, on an outer side in the radial direction of the turbine blade wheel 17 with respect to the communication passage 29. The turbine scroll flow path 31 communicates with a gas inlet port (not illustrated). Exhaust gas discharged from an exhaust manifold of the engine (not illustrated) is guided to the gas inlet port. The communication passage 29 communicates the turbine scroll flow path 31 with the discharge port 27 via the turbine blade wheel 17. The exhaust gas guided from the gas inlet port to the turbine scroll flow path 31 is guided to the discharge port 27 via the communication passage 29 and the turbine blade wheel 17. The exhaust gas guided to the discharge port 27 rotates the turbine blade wheel 17 in the process of flowing therethrough.

The turning force of the turbine blade wheel 17 is transmitted to the compressor impeller 19 via the shaft 15. When the compressor impeller 19 rotates, the air is pressurized as described above. In this manner, the air is guided to the intake port of the engine.

Figure 2:
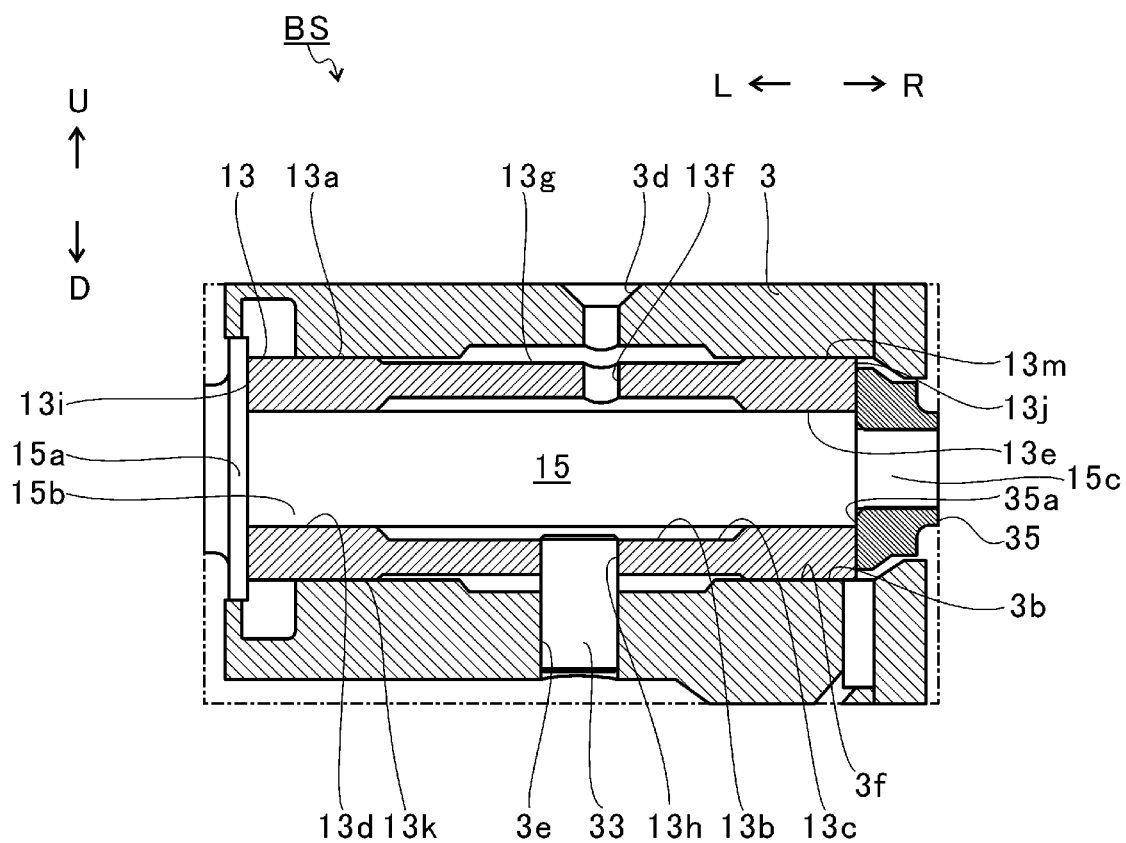
FIG. 2 is an extracted diagram of an alternate long and short dash line portion of FIG. 1.

FIG. 2 is an extracted diagram of an alternate long and short dash line portion of FIG. 1. As illustrated in FIG. 2, a bearing structure BS is provided inside the bearing housing 3. The bearing structure BS includes the bearing hole 3b, the bearing 13, and the shaft 15.

An oil passage 3d is formed in the bearing housing 3. Lubricating oil is supplied to the oil passage 3d. The oil passage 3d opens to (communicates with) the bearing hole 3b. The oil passage 3d guides the lubricating oil to the bearing hole 3b. The lubricating oil flows into the bearing hole 3b from the oil passage 3d.

The bearing 13 is disposed in the bearing hole 3b. The bearing 13 has an annular main body 13a. An insertion hole 13b is formed in the main body 13a. The insertion hole 13b penetrates through the main body 13a in the axial direction of the shaft 15. The axial direction of the shaft 15 intersects with (specifically, orthogonal to) the vertical direction. The shaft 15 is inserted through the insertion hole 13b. The main body 13a extends in a direction intersecting with (specifically, in a direction orthogonal to) the vertical direction. Hereinafter, the axial direction, the radial direction, and the circumferential direction of the bearing 13 (that is, the axial direction, the radial direction, and the circumferential direction of the main body 13a and the shaft 15) are also simply referred to as the axial direction, the radial direction, and the circumferential direction, respectively.

Two radial bearing surfaces 13d and 13e are formed on an inner curved surface 13c of the main body 13a (specifically, the insertion hole 13b). The two radial bearing surfaces 13d and 13e are spaced apart in the axial direction. An oil hole 13f is formed in the main body 13a. The oil hole 13f penetrates through the main body 13a from the inner curved surface 13c to an outer curved surface 13g. The oil hole 13f is disposed between the two radial bearing surfaces 13d and 13e. The oil hole 13f faces the opening of the oil passage 3d in the radial direction of the bearing 13.

The lubricating oil flows from the outer curved surface 13g side of the main body 13a to the inner curved surface 13c side through the oil hole 13f. The lubricating oil that has flown into the inner curved surface 13c side of the main body 13a moves along the circumferential direction between the inner curved surface 13c and the shaft 15. The lubricating oil that has flown into the inner curved surface 13c side of the main body 13a moves between the inner curved surface 13c and the shaft 15 along the axial direction (left-right direction in FIG. 2). The lubricating oil is supplied to clearances between the shaft 15 and the two radial bearing surfaces 13d and 13e. The shaft 15 is pivotally supported by the oil film pressure of the lubricating oil. The two radial bearing surfaces 13d and 13e receive a radial load (that is, a load in the radial direction) of the shaft 15.

A through-hole 13h is formed in the main body 13a. The through-hole 13h penetrates from the inner curved surface 13c to the outer curved surface 13g of the main body 13a. The through-hole 13h is disposed between the two radial bearing surfaces 13d and 13e. The through-hole 13h is disposed on the side of the main body 13a opposite to the side where the oil hole 13f is formed. However, the position of the through-hole 13h is not limited thereto and is only required to be different from the position of the oil hole 13f in the circumferential direction.

A pin hole 3e is formed in the bearing housing 3. The pin hole 3e is formed in the bearing hole 3b at a position facing the through-hole 13h. The pin hole 3e penetrates through a wall portion forming the bearing hole 3b. The pin hole 3e communicates the internal space and the external space of the bearing hole 3b. A positioning pin 33 is inserted into the pin hole 3e. Specifically, the positioning pin 33 is press-fitted into the pin hole 3e. A tip of the positioning pin 33 is inserted into the through-hole 13h of the main body 13a. The positioning pin 33 restricts the movement of the main body 13a in the rotation direction and the axial direction.

The shaft 15 includes a large-diameter portion 15a, a medium-diameter portion 15b, and a small-diameter portion 15c. The large-diameter portion 15a is positioned closer to the turbine blade wheel 17 (see FIG. 1) than the main body 13a. The large-diameter portion 15a has a cylindrical shape. The outer diameter of the large-diameter portion 15a is larger than the inner diameter of the inner curved surface 13c (specifically, the radial bearing surface 13d) of the main body 13a. The outer diameter of the large-diameter portion 15a is larger than the outer diameter of the outer curved surface 13g of the main body 13a. However, the outer diameter of the large-diameter portion 15a may be equal to or smaller than the outer diameter of the outer curved surface 13g of the main body 13a. The large-diameter portion 15a faces the main body 13a in the axial direction. The large-diameter portion 15a has a constant outer diameter. However, the outer diameter of the large-diameter portion 15a may not be constant.

The medium-diameter portion 15b is positioned closer to the compressor impeller 19 (see FIG. 1) side than the large-diameter portion 15a. The medium-diameter portion 15b has a cylindrical shape. The medium-diameter portion 15b is inserted into the insertion hole 13b of the main body 13a. Therefore, the medium-diameter portion 15b faces the inner curved surface 13c of the insertion hole 13b in the radial direction. The medium-diameter portion 15b has an outer diameter smaller than that of the large-diameter portion 15a. The outer diameter of the medium-diameter portion 15b is smaller than the inner diameters of the radial bearing surfaces 13d and 13e of the main body 13a. The medium-diameter portion 15b has a constant outer diameter. However, the outer diameter of the medium-diameter portion 15b may not be constant.

The small-diameter portion 15c is positioned closer to the compressor impeller 19 (see FIG. 1) side (that is, on the compressor impeller 19 side with respect to the main body 13a) than the medium-diameter portion 15b is. The small-diameter portion 15c has a cylindrical shape. The small-diameter portion 15c has an outer diameter smaller than that of the medium-diameter portion 15b. The small-diameter portion 15c has a constant outer diameter. However, the outer diameter of the small-diameter portion 15c may not be constant.

An annular oil thrower member 35 is inserted into the small-diameter portion 15c. The oil thrower member 35 scatters the lubricating oil flowing to the compressor impeller 19 side along the shaft 15 to the outer side in the radial direction. That is, the oil thrower member 35 suppresses leakage of lubricating oil to the compressor impeller 19 side.

The oil thrower member 35 has an outer diameter larger than that of the medium-diameter portion 15b. The outer diameter of the oil thrower member 35 is larger than the inner diameter of the inner curved surface 13c of the main body 13a (specifically, the radial bearing surface 13e). The outer diameter of the oil thrower member 35 is smaller than the outer diameter of the outer curved surface 13g of the main body 13a. However, the outer diameter of the oil thrower member 35 may be equal to or larger than the outer diameter of the outer curved surface 13g of the main body 13a. The oil thrower member 35 faces the main body 13a in the axial direction.

The main body 13a is sandwiched between the oil thrower member 35 and the large-diameter portion 15a in the axial direction. Thrust bearing surfaces 13i and 13j are provided on the end surfaces of the main body 13a. The thrust bearing surface 13i is provided on an end surface of the main body 13a on the turbine blade wheel 17 (see FIG. 1) side. The thrust bearing surface 13j is provided on an end surface of the main body 13a on the compressor impeller 19 (see FIG. 1) side. Lubricating oil is supplied to the thrust bearing surface 13i through the inner curved surface 13c. As a result, lubricating oil is supplied to a clearance between the main body 13a and the large-diameter portion 15a. Lubricating oil is supplied to the thrust bearing surface 13j through the inner curved surface 13c. Lubricating oil is supplied to a clearance between the main body 13a and the oil thrower member 35.

When the shaft 15 moves in the axial direction (to the left side in FIG. 2), the load in the thrust direction (axial direction) is supported by the oil film pressure of the lubricating oil supplied to the thrust bearing surface 13i (that is, lubricating oil between the main body 13a and the large-diameter portion 15a). When the shaft 15 moves in the axial direction (rightward in FIG. 2), the load in the thrust direction (axial direction) is supported by the oil film pressure of the lubricating oil supplied to the thrust bearing surface 13j (that is, lubricating oil between the main body 13a and the oil thrower member 35). In this manner, the two thrust bearing surfaces 13i and 13j receive the thrust load.

Damper portions 13k and 13m are formed on the outer curved surface 13g of the main body 13a. The damper portions 13k and 13m are separated from each other in the axial direction. The damper portions 13k and 13m are formed at both ends of the outer curved surface 13g in the axial direction. The outer diameters of the damper portions 13k and 13m are larger than the outer diameter of other portions of the outer curved surface 13g. Lubricating oil is supplied to clearances between the damper portions 13k and 13m and the inner curved surface 3f of the bearing hole 3b. The vibration of the shaft 15 is suppressed by the oil film pressure of the lubricating oil.

Figure 3:
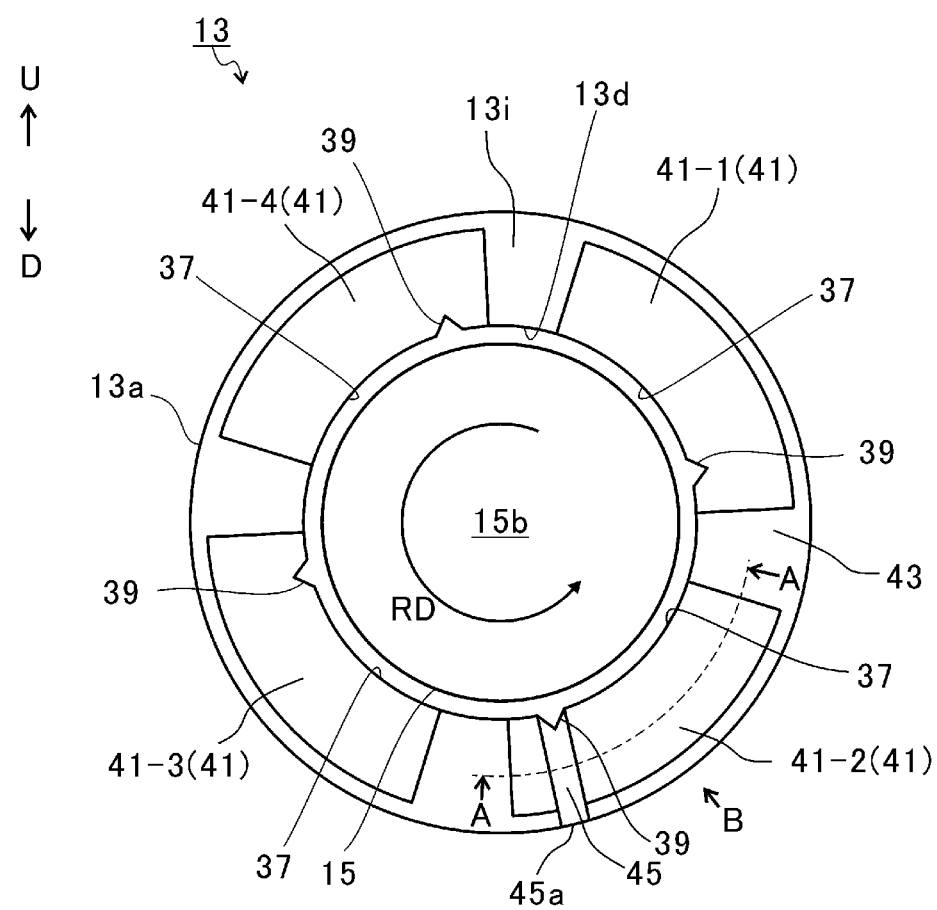
FIG. 3 is a front view illustrating a thrust bearing surface in a bearing according to the embodiment of the present disclosure.

FIG. 3 is a front view illustrating the thrust bearing surface 13i in the bearing 13 according to the embodiment. FIG. 3 is a diagram of the thrust bearing surface 13i as viewed from the left side in FIG. 2. Note that the thrust bearing surface 13j has substantially the same shape as that of the thrust bearing surface 13i. Therefore, description of the shape of the thrust bearing surface 13*j* is omitted. The shape of the radial bearing surface 13*e* is substantially the same as that of the radial bearing surface 13*d*. Therefore, description of the shape of the radial bearing surface 13*e* is omitted.

As illustrated in FIG. 3, a plurality of arcuate surfaces 37 and a plurality of oil supply grooves 39 are formed on the radial bearing surface 13*d*. In the example of FIG. 3, the radial bearing surface 13*d* has four arcuate surfaces 37 and four oil supply grooves 39. However, the number of the arcuate surfaces 37 and the number of the oil supply grooves 39 are not limited thereto and may be other than four.

The plurality of arcuate surfaces 37 is separated from the shaft 15 in the radial direction. The plurality of arcuate surfaces 37 is arranged side by side in the circumferential direction. The positions of the centers of curvature of the plurality of arcuate surfaces 37 coincide with each other. That is, the plurality of arcuate surfaces 37 is located on the same cylindrical surface. However, the positions of the centers of curvature of the plurality of arcuate surfaces 37 may be different from each other. An oil supply groove 39 is formed between two arcuate surfaces 37 adjacent to each other in the circumferential direction. The oil supply grooves 39 are formed in the radial bearing surface 13*d* at intervals in the circumferential direction. The oil supply grooves 39 extend in the axial direction. The shape of the flow path cross section of an oil supply groove 39 (that is, the shape in the cross section orthogonal to the axial direction) is a shape in which the width in the circumferential direction becomes narrower as it is closer to the radially outer side (specifically, a triangular shape). However, the shape of a flow path cross section of an oil supply groove 39 may have a polygonal shape (for example, a rectangular shape) other than a triangular shape, a semicircular shape, or the like.

An oil supply groove 39 extends from an end of the radial bearing surface 13*d* on a side, where the two radial bearing surfaces 13*d* and 13*e* (see FIG. 2) are close to each other, to an end of the radial bearing surface 13*d* on a side where the two radial bearing surfaces 13*d* and 13*e* are separated from each other. The oil supply grooves 39 are open to the thrust bearing surface 13*i* (that is, an end surface of the main body 13*a* in the axial direction). The oil supply grooves 39 allow the lubricating oil to flow. The oil supply grooves 39 supply the lubricating oil to the radial bearing surface 13*d*. The oil supply grooves 39 supply the lubricating oil also to the thrust bearing surface 13*i*.

The lubricating oil between the shaft 15 and the radial bearing surface 13*d* moves in a rotation direction RD of the shaft 15 as the shaft 15 rotates. At this point, the lubricating oil is compressed between the arcuate surfaces 37 of the radial bearing surface 13*d* and the shaft 15. The compressed lubricating oil presses the shaft 15 radially inward (that is, in the radial direction) (wedge effect). As a result, the radial load is supported by the radial bearing surface 13*d*.

As illustrated in FIG. 3, a plurality of tapered portions 41 (specifically, tapered portions 41-1, 41-2, 41-3, and 41-4) and a land portion 43 are formed on the thrust bearing surface 13*i*. The tapered portions 41 are portions recessed with respect to a plane orthogonal to the axial direction on the thrust bearing surface 13*i*. The land portion 43 is a portion (that is, a planar portion orthogonal to the axial direction) of the thrust bearing surface 13*i* where the tapered portions 41 are not formed. In the example of FIG. 3, the thrust bearing surface 13*i* has four tapered portions 41. However, the number of the tapered portions 41 is not limited thereto and may be other than four.

The tapered portions 41 are separated from an outer peripheral edge of the thrust bearing surface 13*i*. On the thrust bearing surface 13*i*, the land portion 43 is included on an outer side of the tapered portions 41 in the radial direction. The tapered portions 41 are connected with the radial bearing surface 13*d*. The tapered portions 41 extend in the circumferential direction. The length of a tapered portion 41 in the radial direction is constant. However, the length of a tapered portion 41 in the radial direction may not be constant.

The plurality of tapered portions 41 are included at intervals in the circumferential direction of the main body 13*a*. The tapered portions 41-1, 41-2, 41-3, and 41-4 are arranged in this order at equal intervals. However, the tapered portions 41-1, 41-2, 41-3, and 41-4 may be arranged at unequal intervals. The tapered portions 41-1 and 41-4 are formed on a vertically upper side (specifically, the upper half in the vertical direction) of the thrust bearing surface 13*i*. The tapered portion 41-4 is closer to the uppermost portion of the thrust bearing surface 13*i* in the vertical direction than the tapered portion 41-1 is. The tapered portions 41-2 and 41-3 are formed on a vertically lower side (specifically, the lower half in the vertical direction) of the thrust bearing surface 13*i*. The tapered portion 41-2 is closer to the lowest portion of the thrust bearing surface 13*i* in the vertical direction than the tapered portion 41-3 is.

A tapered portion 41 communicates with an oil supply groove 39. Each of the tapered portions 41-1, 41-2, 41-3, and 41-4 communicates with one oil supply groove 39.

Figure 4:
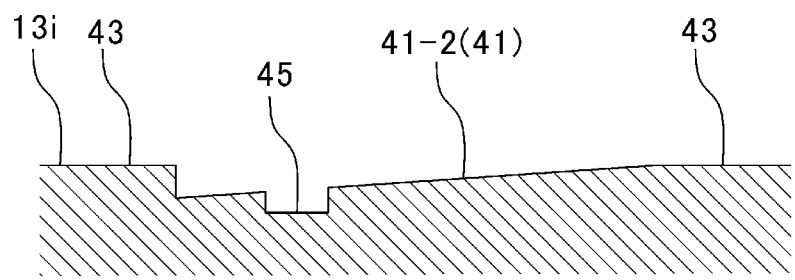
FIG. 4 is a cross-sectional view taken along line A-A in FIG. 3.

FIG. 4 is a cross-sectional view taken along line A-A in FIG. 3. The cross section A-A in FIG. 3 is a cross section along the circumferential direction of the main body 13*a* passing through the tapered portion 41-2. That is, in FIG. 4, illustrated a cross-sectional shape along the circumferential direction of the tapered portion 41-2. As described later, the tapered portion 41-2 includes an oil discharge groove 45. Meanwhile, the tapered portions 41-1, 41-3, and 41-4 do not include the oil discharge groove 45. The tapered portions 41-1, 41-3, and 41-4 have substantially the same shape as that of the tapered portion 41-2 except for the presence or absence of the oil discharge groove 45. Therefore, description of the shapes of the tapered portions 41-1, 41-3, and 41-4 is omitted.

As illustrated in FIG. 4, the tapered portion 41 becomes shallower as it extends in the circumferential direction (specifically, the rotation direction RD of the shaft 15). The tapered portion 41 is inclined with respect to the circumferential direction at a constant inclination angle. However, the inclination angle of the tapered portion 41 may vary depending on the circumferential position. The lubricating oil supplied to the thrust bearing surface 13*i* moves in the rotation direction RD of the shaft 15 as the shaft 15 rotates. At this point, the lubricating oil is compressed between the tapered portions 41 of the thrust bearing surface 13*i* and the large-diameter portion 15*a* (see FIG. 2). The compressed lubricating oil presses the large-diameter portion 15*a* in the axial direction (that is, in the thrust direction) (wedge effect). As a result, the oil film pressure is likely to be generated, and the withstanding load in the thrust direction by the thrust bearing surface 13*i* increases.

As illustrated in FIGS. 3 and 4, the thrust bearing surface 13*i* includes the oil discharge groove 45. The oil discharge groove 45 passes through one tapered portion 41-2 among the plurality of tapered portions 41. The oil discharge groove 45 connects the oil supply groove 39 (specifically, the oil supply groove 39 communicating with the tapered portion 41-2) and the outer peripheral edge of the thrust bearing surface 13*i*. The lubricating oil supplied to the thrust bearing surface 13*i* passes through the oil discharge groove 45 and is discharged from an opening 45*a* (hereinafter also referred to as the opening 45*a* on an outer peripheral edge side of the oil discharge groove 45) on the outer peripheral edge side of the thrust bearing surface 13*i* in the oil discharge groove 45. The oil discharge groove 45 promotes the flow of the lubricating oil in the thrust bearing surface 13*i* by discharging the lubricating oil supplied to the thrust bearing surface 13*i* from the thrust bearing surface 13*i*. As a result, an increase in the temperature of the oil film formed on the thrust bearing surface 13*i* is suppressed, and a decrease in the viscosity accompanying the increase in the temperature is suppressed. Therefore, a decrease in the withstanding load in the thrust direction by the thrust bearing surface 13*i* is suppressed.

The oil discharge groove 45 extends in the radial direction of the main body 13*a*. However, the oil discharge groove 45 may extend in a direction inclined with respect to the radial direction of the main body 13*a*. The oil discharge groove 45 is included on the thrust bearing surface 13*i* on the oil discharge port 3*c* (see FIG. 1) side of the bearing housing 3. As a result, the lubricating oil scatters from the bearing 13 toward the oil discharge port 3*c*, and the discharge of the lubricating oil via the bearing housing 3 is smoothly performed. From the viewpoint of smoothly discharging the lubricating oil, for example, when the bearing 13 is viewed in the axial direction of the main body 13*a*, it is preferable that the oil discharge port 3*c* (see FIG. 1) of the bearing housing 3 be located on an extension line of the oil discharge groove 45.

The shape of a flow path cross section of the oil discharge groove 45 (that is, the shape in the cross section orthogonal to the extending direction of the oil discharge groove 45) is rectangular. However, the flow path cross section of the oil discharge groove 45 may have a polygonal shape (for example, a triangular shape) other than the rectangular shape, a semicircular shape, or others.

In the examples of FIGS. 3 and 4, the oil discharge groove 45 is separated from an end (specifically, the left end in FIG. 4) of the tapered portion 41-2 in the rotation direction RD. However, the positional relationship between the tapered portion 41-2 and the oil discharge groove 45 is not limited to the example of FIGS. 3 and 4. For example, the oil discharge groove 45 may pass through the end of the tapered portion 41-2 in the rotation direction RD.

As described above, in the bearing 13 according to the present embodiment, the thrust bearing surface 13*i* includes the plurality of tapered portions 41. As a result, the oil film pressure is likely to be generated, and the withstanding load in the thrust direction by the thrust bearing surface 13*i* increases. Incidentally, if an oil discharge grooves 45 is included for each of the plurality of tapered portions 41, the flow of lubricating oil on the thrust bearing surface 13*i* is excessively promoted, and the amount of lubricating oil discharged from the bearing 13 becomes excessively large. As a result, the oil sealing performance of the turbocharger TC decreases.

Meanwhile, in the bearing 13 according to the present embodiment, the oil discharge groove 45 is included only for one tapered portion 41-2 among the plurality of tapered portions 41. As a result, the amount of lubricating oil discharged from the bearing 13 is suppressed from becoming excessively large, thereby suppressing deterioration of the oil sealability. Furthermore, with the flow of the lubricating oil on the thrust bearing surface 13*i* promoted, an increase in the temperature of the oil film is suppressed, and a decrease in the viscosity accompanying the increase in the temperature is suppressed. Therefore, a decrease in the withstanding load in the thrust direction by the thrust bearing surface 13*i* is suppressed. As described above, according to the present embodiment, the withstanding load of the bearing 13 in the thrust direction can be improved appropriately.

Note that the larger the flow path cross-sectional area of the opening 45*a* on the outer peripheral edge side of the oil discharge groove 45 is, the larger the amount of lubricating oil discharged from the opening 45*a* is. On the other hand, the smaller the flow path cross-sectional area of the opening 45*a* on the outer peripheral edge side of the oil discharge groove 45 is, the smaller the amount of lubricating oil discharged from the opening 45*a* is. Therefore, from the viewpoint of more appropriately achieving both of suppression of a decrease in the oil sealability in the turbocharger TC and suppression of a decrease in the viscosity accompanying an increase in the temperature of the oil film on the thrust bearing surface 13*i*, it is preferable to optimize the flow path cross-sectional area of the opening 45*a* on the outer peripheral edge side of the oil discharge groove 45.

Figure 5:
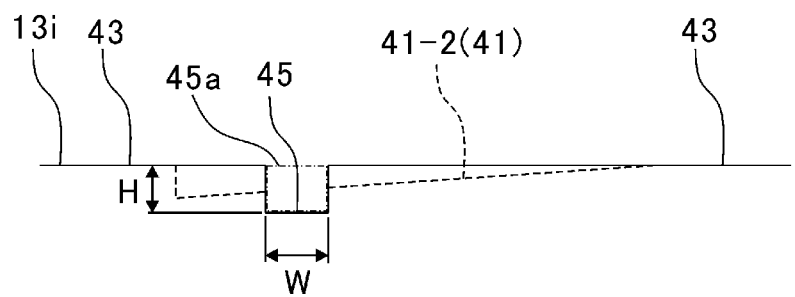
FIG. 5 is a diagram illustrating the bearing as viewed from a direction of arrow B in FIG. 3.

FIG. 5 is a diagram illustrating the bearing 13 as viewed from a direction of arrow B in FIG. 3. Specifically, FIG. 5 is a diagram illustrating the tapered portion 41-2 as viewed from the radially outer side of the outer peripheral edge of the thrust bearing surface 13*i*. In the example of FIG. 5, the opening 45*a* on the outer peripheral edge side of the oil discharge groove 45 has a rectangular shape. Therefore, the flow path cross-sectional area of the opening 45*a* on the outer peripheral edge side of the oil discharge groove 45 is determined depending on a width W (that is, the length in the circumferential direction) and a depth H (that is, the axial length) of the opening 45*a*. In other words, the flow path cross-sectional area of the opening 45*a* is set by setting the width W and the depth H of the opening 45*a*.

Figure 6:
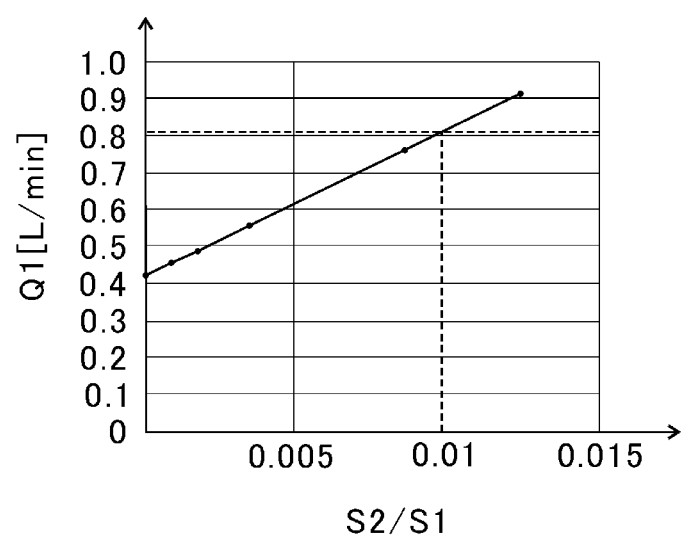
FIG. 6 is a graph illustrating a relationship between the ratio of a flow path cross-sectional area of an opening on an outer peripheral edge side of an oil discharge groove to the area of the thrust bearing surface in the bearing according to the embodiment of the present disclosure and a flow rate of lubricating oil discharged from the bearing.

FIG. 6 is a graph illustrating the relationship between the ratio S2/S1 of a flow path cross-sectional area S2 of the opening 45*a* on the outer peripheral edge side of the oil discharge groove 45 to an area S1 of the thrust bearing surface 13*i* in the bearing 13 (specifically, a projection area of the thrust bearing surface 13*i* in the axial direction) according to the present embodiment and a flow rate Q1 [L/min] of the lubricating oil discharged from the bearing 13. FIG. 6 is a graph obtained by numerical analysis simulation.

As illustrated in FIG. 6, the flow rate Q1 increases as the ratio S2/S1 increases. As described above, in the present embodiment, since the plurality of tapered portions 41 is included on the thrust bearing surface 13*i*, the withstanding load in the thrust direction is increased. Incidentally, as the flow rate Q1 increases, the flow of the lubricating oil on the thrust bearing surface 13*i* is effectively promoted. Therefore, an increase in the temperature of the oil film and a decrease in the viscosity accompanying the increase in the temperature are effectively suppressed, and the withstanding load in the thrust direction is effectively increased. However, in general, in a thrust bearing, the flow rate Q1 is required to be smaller than about 0.8 [L/min] (for example, the degree indicated by a broken horizontal line in FIG. 6) in order to ensure the oil sealability. According to the graph of FIG. 6, in a case where the ratio S2/S1 is less than or equal to 0.01, the flow rate Q1 is smaller than about 0.8 [L/min]. That is, it can be seen that in a case where the ratio S2/S1 is less than or equal to 0.01, deterioration of the oil sealability is appropriately suppressed.

Here, even in a case where the oil discharge groove 45 is included in each of the plurality of tapered portions 41, it is conceivable that the flow rate Q1 of the lubricating oil discharged from the bearing 13 can be adjusted by adjusting the opening 45a of each of the oil discharge grooves 45. However, there is a limit to the minimum value of the amount of the lubricating oil discharged from each of the oil discharge grooves 45, and in addition, in a case where an oil discharge groove 45 is included at a position different from that of the oil discharge port 3c side of the bearing housing 3, it may deteriorate the oil sealability. Therefore, by setting the number of the oil discharge grooves 45 to one as in the present embodiment, reducing the flow rate Q1 is appropriately achieved to such an extent that deterioration in the oil sealability is appropriately suppressed. Furthermore, by including the oil discharge groove 45 on the thrust bearing surface 13i on the oil discharge port 3c side of the bearing housing 3, the oil sealability can be further improved.

Figure 7:
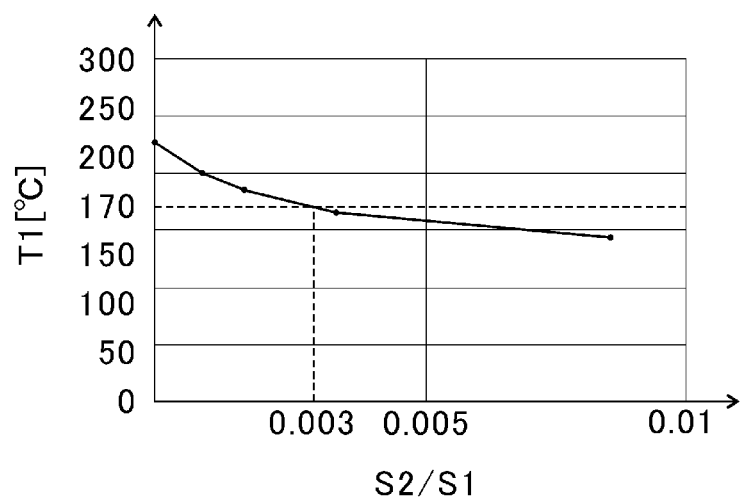
FIG. 7 is a graph illustrating a relationship between the ratio of the flow path cross-sectional area of the opening on the outer peripheral edge side of the oil discharge groove to the area of the thrust bearing surface in the bearing according to the embodiment of the present disclosure and the temperature of an oil film formed on the thrust bearing surface.

FIG. 7 is a graph illustrating the relationship between the ratio S2/S1 of the flow path cross-sectional area S2 of the opening 45a on the outer peripheral edge side of the oil discharge groove 45 to the area S1 of the thrust bearing surface 13i in the bearing 13 according to the present embodiment and the temperature T1 [° C.] of the oil film formed on the thrust bearing surface 13i. FIG. 7 is a graph obtained by numerical analysis simulation.

As illustrated in FIG. 7, the temperature T1 decreases as the ratio S2/S1 increases. As described above, the higher the ratio S2/S1 is, the larger the flow rate Q1 is, and the flow of the lubricating oil on the thrust bearing surface 13i is effectively promoted. As a result, an increase in the temperature T1 of the oil film and a decrease in the viscosity accompanying the increase in the temperature T1 are effectively suppressed, and the withstanding load in the thrust direction is effectively increased. Incidentally, in general, in a thrust bearing, a temperature T1 is required to be less than or equal to 170 [° C.] in order to ensure a withstanding load in a thrust direction. According to the graph of FIG. 7, in a case where the ratio S2/S1 is greater than or equal to 0.003, the temperature T1 is less than or equal to 170 [° C.]. That is, in a case where the ratio S2/S1 is greater than or equal to 0.003, it is understood that a decrease in the viscosity of the oil film due to an increase in the temperature is appropriately suppressed and that a decrease in the withstanding load in the thrust direction by the thrust bearing surface 13i is appropriately suppressed.

As described above, it is particularly preferable that the ratio S2/S1 is within a range between 0.003 and 0.01 from the viewpoint of more appropriately achieving both suppression of a decrease in the oil sealability in the turbocharger TC and suppression of a decrease in the viscosity accompanying an increase in the temperature of the oil film on the thrust bearing surface 13i.

Although the embodiment of the present disclosure has been described with reference to the accompanying drawings, it is naturally understood that the present disclosure is not limited to the above embodiment. It is clear that those skilled in the art can conceive various modifications or variations within the scope described in the claims, and it is understood that they are naturally also within the technical scope of the present disclosure.

The example in which the bearing 13 is included in the turbocharger TC has been described above. However, the bearing 13 may be included in a device other than the turbocharger TC (For example, a ship or the like).

The example in which the bearing 13 is a semi-floating bearing has been described above. However, the bearing 13 may be a bearing other than the semi-floating bearing as long as it has a thrust bearing surface.

The invention claimed is:

1. A bearing comprising:
one annular main body through which a shaft is inserted;
a plurality of oil supply grooves included on an inner curved surface of the one main body and extending in an axial direction of the one main body;
a thrust bearing surface included on an end surface of the one main body and included in the one main body;
a plurality of tapered portions included on the thrust bearing surface separated from an outer peripheral edge of the thrust bearing surface at intervals in a circumferential direction of the main body and communicating with the oil supply grooves, the tapered portions each becoming shallower as the tapered portion extends in the circumferential direction; and
an oil discharge groove included on the thrust bearing surface and passing through one tapered portion among the plurality of tapered portions, the oil discharge groove connecting an oil supply groove and the outer peripheral edge.

2. The bearing according to claim 1,
wherein a ratio of a flow path cross-sectional area of an opening of the oil discharge groove on an outer peripheral edge side to an area of the thrust bearing surface is less than or equal to 0.01.

3. The bearing according to claim 1,
wherein a ratio of a flow path cross-sectional area of an opening of the oil discharge groove on the outer peripheral edge side to an area of the thrust bearing surface is greater than or equal to 0.003.

4. The bearing according to claim 2,
wherein a ratio of a flow path cross-sectional area of an opening of the oil discharge groove on the outer peripheral edge side to an area of the thrust bearing surface is greater than or equal to 0.003.

5. A turbocharger comprising the bearing according to claim 1.

6. A turbocharger comprising the bearing according to claim 2.

7. A turbocharger comprising the bearing according to claim 3.

8. A turbocharger comprising the bearing according to claim 4.

* * * * *